US012810466B2

(12) United States Patent
Yano et al.

(10) Patent No.: US 12,810,466 B2
(45) Date of Patent: Nov. 24, 2026

(54) OBJECT RECOGNITION APPARATUS, ROBOT SYSTEM, AND OBJECT RECOGNITION METHOD

(71) Applicant: Hitachi, Ltd., Tokyo (JP)

(72) Inventors: Taiki Yano, Tokyo (JP); Nobutaka Kimura, Tokyo (JP); Kiyoto Ito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 110 days.

(21) Appl. No.: 18/865,845

(22) PCT Filed: May 29, 2023

(86) PCT No.: PCT/JP2023/019831

§ 371 (c)(1),
(2) Date: Nov. 14, 2024

(87) PCT Pub. No.: WO2024/057627

PCT Pub. Date: Mar. 21, 2024

(65) Prior Publication Data

US 2025/0308063 A1 Oct. 2, 2025

(30) Foreign Application Priority Data

Sep. 13, 2022 (JP) ................................ 2022-145239

(51) Int. Cl.
*G06T 7/73* (2017.01)
*B25J 9/16* (2006.01)
(Continued)

(52) U.S. Cl.
CPC ............... *G06T 7/73* (2017.01); *B25J 9/1697* (2013.01); *G06V 10/74* (2022.01); *G06V 20/50* (2022.01)

(58) Field of Classification Search
CPC ............... G06T 7/70–77; G06T 1/0014; G06T 2207/30164; G06T 7/0004–001; B25J 19/023; B25J 9/0093; G06V 2201/06
See application file for complete search history.

(56) References Cited

U.S. PATENT DOCUMENTS 6,067,366 A * 5/2000 Simanovsky .......... G06V 20/52 382/257
2007/0038937 A1 2/2007 Asakawa et al.

FOREIGN PATENT DOCUMENTS

JP 2007-072528 A 3/2007
JP 2021-109257 A 8/2021

OTHER PUBLICATIONS

International Search Report of PCT/JP2023/019831 dated Jun. 27, 2023.

* cited by examiner

*Primary Examiner* — Raphael Schwartz
(74) *Attorney, Agent, or Firm* — MATTINGLY & MALUR, PC

(57) ABSTRACT

The present invention provides an object recognition device that can recognize a lump of transport target objects (group of the same articles) as a transport unit on the basis of an arrangement of individual articles in an article group. The object recognition device recognizes the group of the same articles, which is a unit of transport in an environment where a plurality of articles exist, the object recognition device characterized by comprising: an input unit that acquires an image of the plurality of articles; an article detection unit that detects, from the image, article areas where the articles exist; and a group-of-same-articles area estimation unit that acquires inter-article area information, which is information related to an arrangement of the article areas, calculates a frequency distribution of the inter-article area information,
(Continued)

and estimates an area of the group of the same articles on the basis of the frequency distribution.

9 Claims, 4 Drawing Sheets

(51) Int. Cl.
*G06V 10/74* (2022.01)
*G06V 20/50* (2022.01)

OBJECT RECOGNITION APPARATUS, ROBOT SYSTEM, AND OBJECT RECOGNITION METHOD

TECHNICAL FIELD

The present invention relates to an object recognition apparatus, a robot system, and an object recognition method.

BACKGROUND ART

In recent logistics warehouses and the like, utilization of such a robot as an articulated arm robot that transports articles has increasingly spread. When this type of a robot transports, for example, a plurality of PET bottles wholly packed with transparent wrap, a PET bottle group, rather than individual PET bottles, packed with transparent wrap must be recognized as a transport unit and the PET bottle group as one lump of objects to be transported must be held in an appropriate position.

As a conventional technology that enables an article group wholly packed with transparent wrap to be recognized as one lump of objects to be transported, a cargo handling apparatus in Patent Literature 1 is known. For example, the abstract of Patent Literature 1 describes a problem to "even when a plurality of articles is bundled with a sheet-like covering, appropriately move the articles," and a solution therefor describes, "A cargo handling control according to an embodiment includes a transmission/reception unit and a control unit. The transmission/reception unit is provided in a cargo handling apparatus that holds an article placed on a placement unit and moves the article, and transmits an ultrasonic wave or a radio wave as a transmission wave to a direction where the placement unit is present and receives a reflected wave of the transmission wave. When, based on a picked-up image of the articles placed on the placement unit, it is recognized that a plurality of articles is present on the placement unit, the control unit determines whether a plurality of articles is bundled with a sheet-like covering based on a result of recognition based on the picked-up image and a result of reception of the reflected wave by the transmission/reception unit, and controls the cargo handling apparatus based on a result of the determination."

With respect to a covering for bundling a plurality of articles, Paragraph 0068 of the patent literature also describes, "The covering B is a transparent or translucent vinyl sheet or the like. The covering B is also referred to as wrapping sheet (sheet) or shrink film (film)."

CITATION LIST

Patent Literature

Patent Literature 1: Japanese Unexamined Patent Application Publication No. 2021-109257

SUMMARY OF INVENTION

Technical Problem

However, as shown in FIGS. 1, 6, 7, 9, and the like in the patent literature, in the cargo handling apparatus in Patent Literature 1, a sensor apparatus 20 is provided in a holding unit 113 at the tip of a robot arm and by identifying a point of reflection of an ultrasonic wave transmitted and received by the sensor apparatus 20, it is determined whether a plurality of articles is bundled with a sheet-like covering; therefore, the following problem arises in terms of operation.

(1) Since a sensing distance of the sensor apparatus 20 utilizing an ultrasonic wave or a radio wave is short; therefore, to determine the presence/absence of a covering, the sensor apparatus 20 (that is, the holding unit 113 at the tip of the robot arm) must be brought closer to the articles to identify a point of reflection of the ultrasonic wave (Refer to FIGS. 3, 7, 9, and the like in Patent Literature 1). For this reason, in the cargo handling apparatus in Patent Literature 1, to detect all the coverings within a picked-up image, the whole area within the picked-up image must be scanned with the sensor apparatus 20 and this poses a problem of determination of the presence/absence of a covering being very time-consuming.

(2) When an article group whose side faces are bound with a transparent wrap, a cardboard, or the like is an object to be transported, a covering is not present at the upper part of the article group; therefore, a cargo handling apparatus in Patent Literature 1 poses a problem: the cargo handling apparatus is not capable of recognizing the article group as a lump of objects to be transported and may mistake the article group as a plurality of articles simply placed together in one place.

In consideration of the above problems, it is an object of the present invention to provide an object recognition apparatus and an object recognition method in which a lump of objects to be transported (identical article group) as transport unit can be recognized based on a disposition of individual articles in an article group.

Solution to Problem

To solve the above problems, an object recognition apparatus of the present invention is an object recognition apparatus that recognizes an identical article group as transport unit in an environment in which a plurality of articles is present; and the object recognition apparatus includes: an input unit that acquires an image of a plurality of the articles; an article detection unit that detects an article area where the articles are present from the image; and an identical article group area estimation unit that acquires individual article area-to-individual article area information, which is information related to a disposition of the article area, computes a frequency distribution of the article area-to-article area information, and estimates an area of the identical article group based on the frequency distribution.

Advantageous Effects of Invention

According to an object recognition apparatus and an object recognition method of the present invention, a lump of objects to be transported (identical article group) as transport unit can be recognized based on a disposition of individual articles in an article group.

DESCRIPTION OF EMBODIMENTS

Hereafter, a description will be given to embodiments of an object recognition apparatus of the present invention with reference to the drawings.

First Embodiment

First, a description will be given to an object recognition apparatus 1 according to the first embodiment of the present invention and a robot system utilizing the object recognition apparatus with reference to FIG. 1 to FIG. 4.

Figure 1:
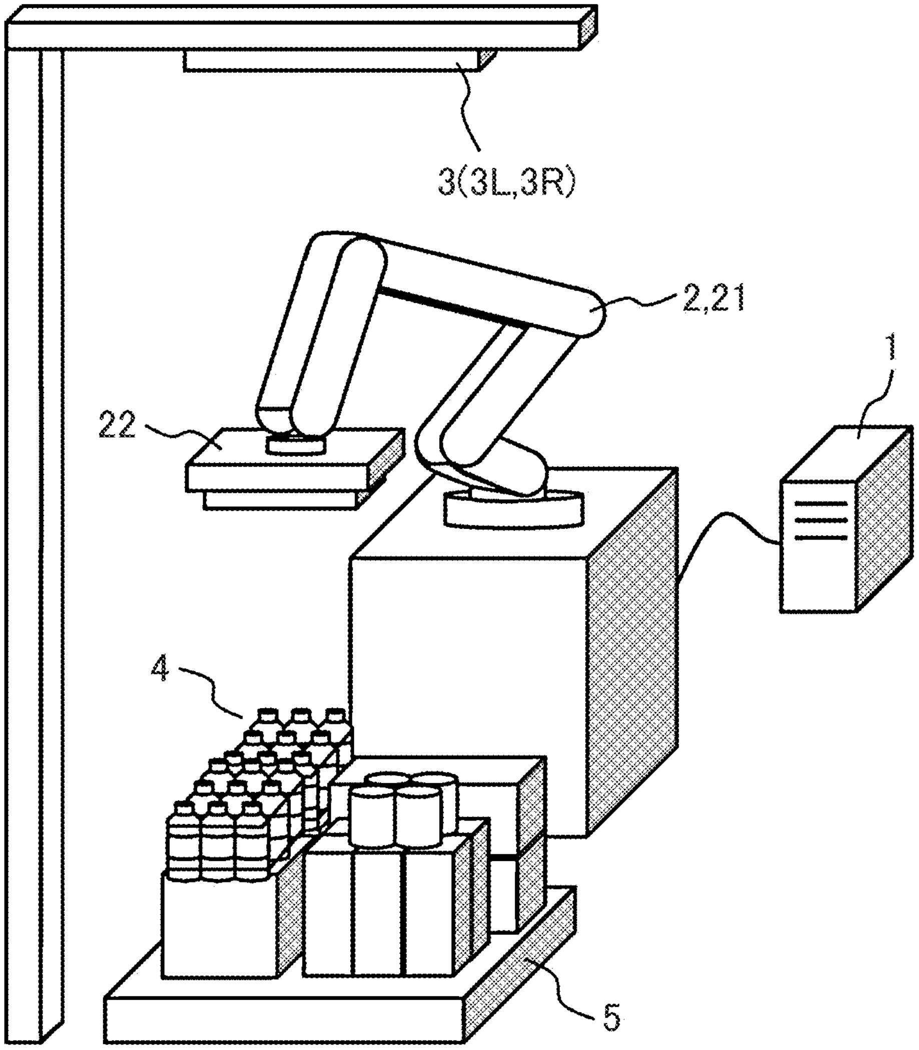
FIG. 1 is a schematic diagram illustrating a use environment of an object recognition apparatus in a first embodiment.

FIG. 1 is a schematic diagram illustrating a use environment of an object recognition apparatus 1. In the drawing, reference numeral 2 denotes an articulated arm robot (hereafter, simply referred to as "robot") having an articulate arm 21 and a hand 22 and controlled by the object recognition apparatus 1; 3 denotes stereo cameras that transmit a stereo image synchronously picked up with a left camera 3L and a right camera 3R to the object recognition apparatus 1; 4 denotes various articles (for example, PET bottles, toilet paper, corrugated board cartons, and the like) transported by the robot 2; and 5 denotes a pallet with the articles 4 placed thereon. As is obvious from in FIG. 1, the robot 2 is installed in a place where the robot can hold any article 4 by the hand 22 on the pallet 5 by moving the articulate arm 21, and the stereo cameras 3 are installed in a place where an image of the entire upper face of the pallet 5 can be picked up.

Figure 2:
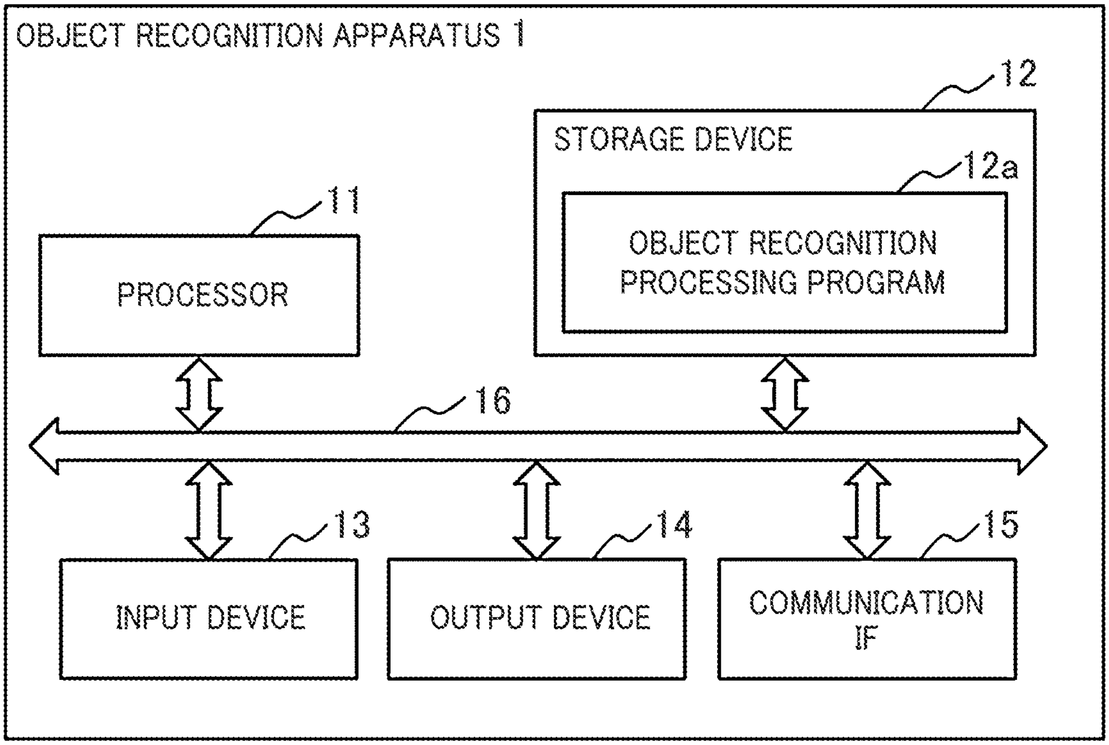
FIG. 2 is a block diagram illustrating a hardware configuration of an object recognition apparatus in the first embodiment.

FIG. 2 is a block diagram illustrating a hardware configuration of the object recognition apparatus 1. As shown here, the object recognition apparatus 1 is a computer provided with: such a processor 11 as CPU; such a storage device 12 as a semiconductor memory; such an input device 13 as a keyboard and a mouse; such an output device 14 as a liquid crystal display; a communication interface 15 for communicating with the robot 2 and the stereo cameras 3; a bus 16 connecting these elements with one another; and the like. An article detection unit 11*a* and an identical article group area estimation unit 11*b*, described later, are implemented by the processor 11 executing an object recognition processing program 12*a* stored in the storage device 12.

Figure 3:
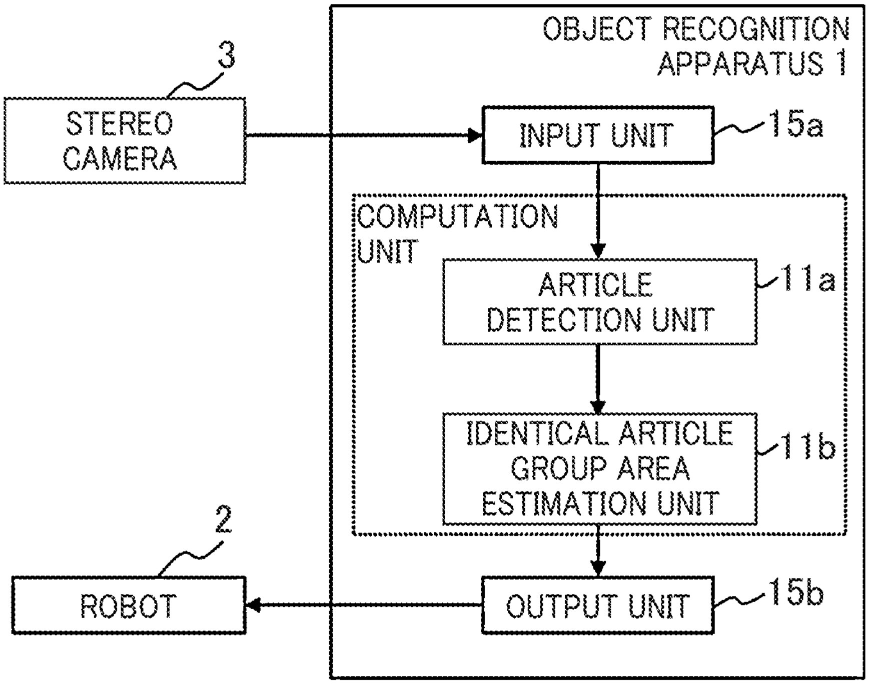
FIG. 3 is a functional block diagram of an object recognition apparatus in the first embodiment.

FIG. 3 is a functional block diagram of the object recognition apparatus 1. As shown here, the object recognition apparatus 1 includes: an input unit 15*a* that receives a stereo image from the stereo cameras 3; an article detection unit 11*a* that processes the received stereo image to detect an article 4; an identical article group area estimation unit 11*b* that pays attention to a disposition of the detected article 4 and estimates an identical article area equivalent to a transport unit; and an output unit 15*b* that transmits an instruction to the robot 2 bases on the position of the estimated identical article area. The input unit 15*a* and the output unit 15*b* are functional parts implemented by the communication interface 15 in FIG. 2.

<Details of Article Detection Unit 11*a* and Identical Article Group Area Estimation Unit 11*b*>

Subsequently, a description will be sequentially given to the details of processing performed at the article detection unit 11*a* and the identical article group area estimation unit 11*b* step by step from Step S1 to Step S5 with reference to FIG. 4. In the following description, an article 4 transported by the robot 2 is a PET bottle and nine PET bottles arranged in a 3×3 matrix wholly packed with a transparent wrap or bundled with a transparent wrap on the side faces and the bottom face are taken as a transport unit (one lump of objects to be transported).

<<Step S1 (Acquisition of Picked-up Image Information) >>

At Step S1, the article detection unit 11*a* acquires the picked-up image information of a subject based on a stereo image picked up with the stereo cameras 3. The left camera 3L of the stereo cameras 3 and the right camera 3R are disposed at a predetermined distance from each other; therefore, when a left image picked up with the left camera 3L and a right image picked up with the right camera 3R are compared with each other, a parallax corresponding to a distance to the subject is observed. Therefore, the article detection unit 11*a* can compute the distance to the imaged subject by utilizing the theory of triangulation to process the stereo image.

When a monocular camera is utilized instead of the stereo cameras 3, a picked-up image itself can be acquired as picked-up image information.

<<Step S2 (Detection of Article Area)>>

At Step S2, the article detection unit 11*a* detects an article area where the individual PET bottles (article 4) are present based on the picked-up image information acquired at Step S1. At Step S1, a distance to the subject is computed; therefore, each of flat circular area groups located in an identical plane as shown in the image diagram in FIG. 4(*a*) can be extracted as an article area where the upper end (specifically, the cap of a PET bottle) of an article 4 is present.

When a monocular camera is utilized instead of the stereo cameras 3, an article area where an individual PET bottle (article 4) is present can be extracted by pattern matching of an image as picked-up image information and a known shape viewed from the top or color of the PET bottle (article 4).

<<Step S3 (Acquisition of Individual Article area-to-individual Article Area Information)>>

At Step S3, the identical article group area estimation unit 11*b* acquires individual article area-to-individual article area information about the disposition of the article areas detected at Step S2. Specifically, as shown in the image diagram in FIG. 4(*b*), the identical article group area estimation unit 11*b* computes a distance (indicated by solid line in FIG. 4(*b*) to an article area adjoining in the vertical direction or in the horizontal direction in the image with respect to each article area detected at Step S2 and acquires the result of computation as individual article area-to-individual article area information. An angle to an adjacent article area or the direction of the normal of each article area may be taken as individual article area-to-individual article area information. Pattern information may also be taken as article area-to-article area information.

<<Step S4 (Computation of Frequency Distribution)>>

At Step S4, the identical article group area estimation unit 11*b* computes a frequency distribution of individual article area-to-individual article area information (distance, angle, direction of normal) acquired at Step S3. For example, first, as indicated by the right graph in FIG. 4(*c*), the identical article group area estimation unit 11*b* plots distance information, which is a kind of the individual article area-to-individual article area information acquired at Step S3, on a graph where the horizontal axis is taken as article-to-article distance and the vertical axis is taken as frequency. In the present example, two types of article-to-article distances of a high-frequency distance group indicated by solid line and a low-frequency distance group indicated by dotted line are computed as a frequency distribution of individual article area-to-individual article area information. Also, when individual article area-to-individual article area information is information of angle or direction of normal, a graph is similarly plotted.

<<Step S5 (Estimation of Identical Article Group Area)>>

At Step S5, the identical article group area estimation unit 11*b* estimates an identical article group area based on the frequency distribution computed as Step S4. As shown in FIG. 4(*c*) as an example, distances between articles 4 include a relatively short distance group indicated by solid line and a relatively long distance group indicated by dotted line. The latter distance group is conceived to be a distance between transport units; therefore, the identical article group area estimation unit 11*b* considers a portion, indicated by dotted line, where a distance between articles 4 is relatively long to be a border between transport units and estimates two identical article group areas as indicated in FIG. 4(*d*). The positional information of the two identical article group areas estimated here is transmitted to a control unit of the robot 2 through the output unit 15*b* and utilized for the robot 2 to appropriately hold each transport unit comprised of nine PET bottles (article 4) arranged in a 3×3 matrix.

Figure 4:
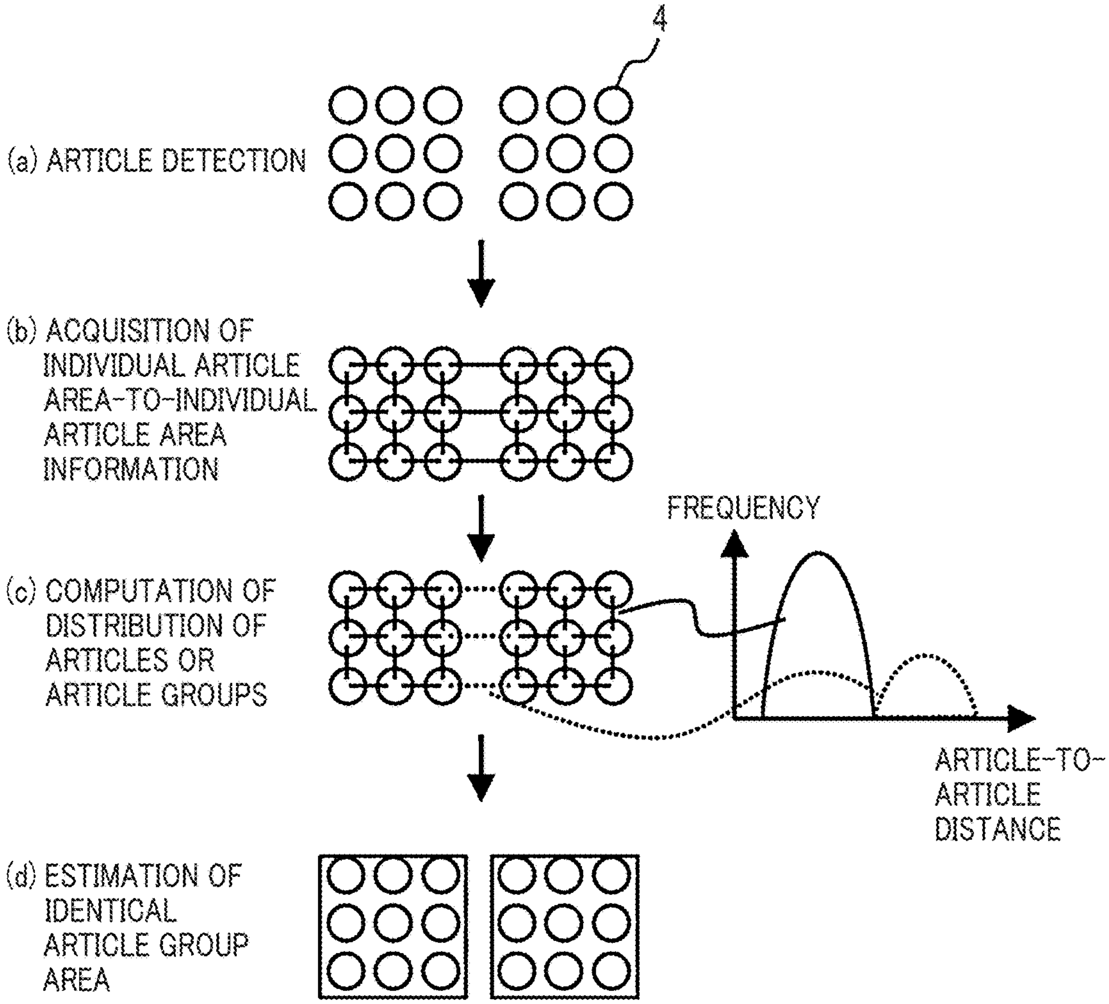
FIG. 4 is a drawing explaining processing of an article detection unit and an identical article area estimation unit.

When the article-to-article distance indicated by dotted line in FIG. 4(*c*) is sufficiently long, a border between identical article group areas can be clearly defined; however, when a difference between a distance between objects in an identical article group area and a distance between identical article groups is small, there can be a case where whether an object group imaged with the stereo cameras 3 is a single object group area or a plurality of identical article groups cannot be determined. Therefore, in such a case, a probability that an imaged object group is a single identical article group area and a probability that the imaged object group is a plurality of identical article group areas may be computed and be outputted to the outside. As a result, the robot 2 can determine operation according to both the probabilities. To compute a probability, various methods are possible; for example, a relative frequency may be directly outputted as probability or such a clustering technique as K-means may be used.

<Effects of Present Embodiment>

As described up to this point, according to an object recognition apparatus 1 in the present embodiment, a lump of objects to be transported (identical article group) as transport unit can be recognized based on a disposition of articles imaged with cameras without use of an ultrasonic sensor or a radio wave sensor. As a result, the robot 2 is capable of moving the hand 22 to a position suitable for holding a lump of objects to be transported bound with a transparent wrap or the like.

Second Embodiment

Subsequently, a description will be given to an object recognition apparatus according to the second embodiment of the present invention with reference to FIG. 5. With respect to an item common to those in the first embodiment, an overlapped description will be omitted.

Figure 5:
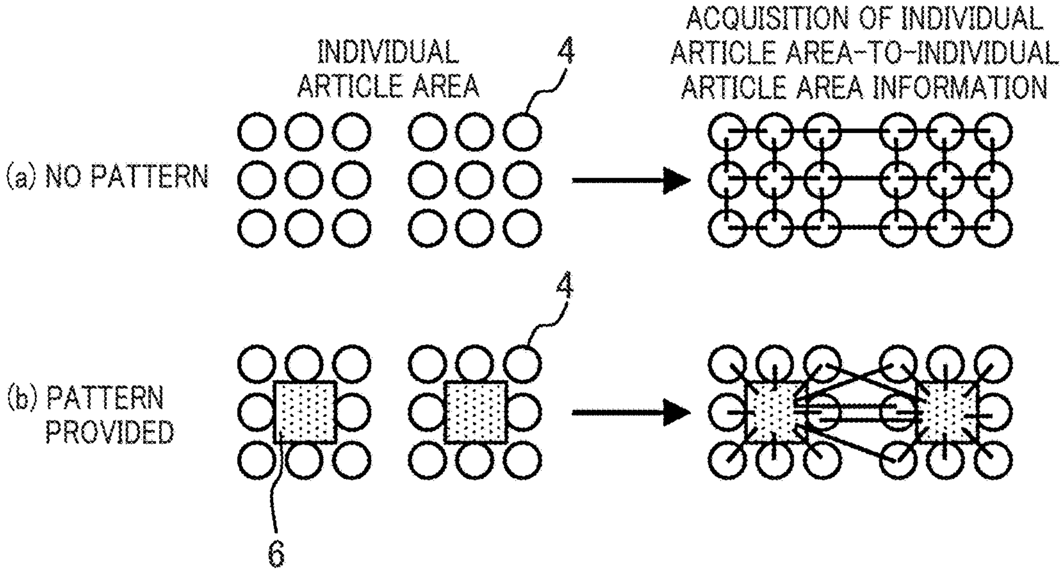
FIG. 5 is a drawing explaining processing of an object recognition apparatus in a second embodiment.

When nine PET bottles (article 4) arranged in a 3×3 matrix are wholly packed with a transparent wrap as in the first embodiment, the stereo cameras 3 are capable of clearly imaging a position of each PET bottle (article 4); therefore, as shown in FIG. 5(*a*), individual article area-to-individual article area information (information of a distance between articles) can be easily acquired.

However, a large number of transparent wraps are partly printed with a pattern 6; when PET bottles (article 4) are packed with such a patterned transparent wrap, the positions of some PET bottles (article 4) cannot be clearly imaged sometimes.

Consequently, when the identical article group area estimation unit 11*b* acquires individual article area-to-individual article area information at Step S3 of the present embodiment, as shown in FIG. 5(*b*), a distance between an article 4 and a pattern 6, an angle between a pattern 6 and an article 4, or the direction of the normal of a pattern 6 is acquired as individual article area-to-individual article area information.

Also, when such a graph as the right graph in FIG. 4(*c*) is plotted based on individual article area-to-individual article area information in the present embodiment, as in the first embodiment, a high-frequency group and a low-frequency group are formed; therefore, by considering a position where the low-frequency group is present as a border between transport units or taking other like measures, a large number of articles 4 can be divided into identical article group areas in an appropriate number.

Third Embodiment

Subsequently, a description will be given to an object recognition apparatus according to the third embodiment of the present invention with reference to FIG. 6. With respect to an item common to those in the above-mentioned embodiments, an overlapped description will be omitted.

Since in the above-mentioned embodiments, features (frequency distribution of individual article area-to-individual article area information) of an article group as transport unit are unknown, a mode of a transport unit must be estimated based on each picked-up image; in the present embodiment, features (frequency distribution of individual article area-to-individual article area information) of an article group as transport unit are known and an article group as transport unit can be extracted on the basis of the known features (frequency distribution of individual article area-to-individual article area information).

Figure 6:
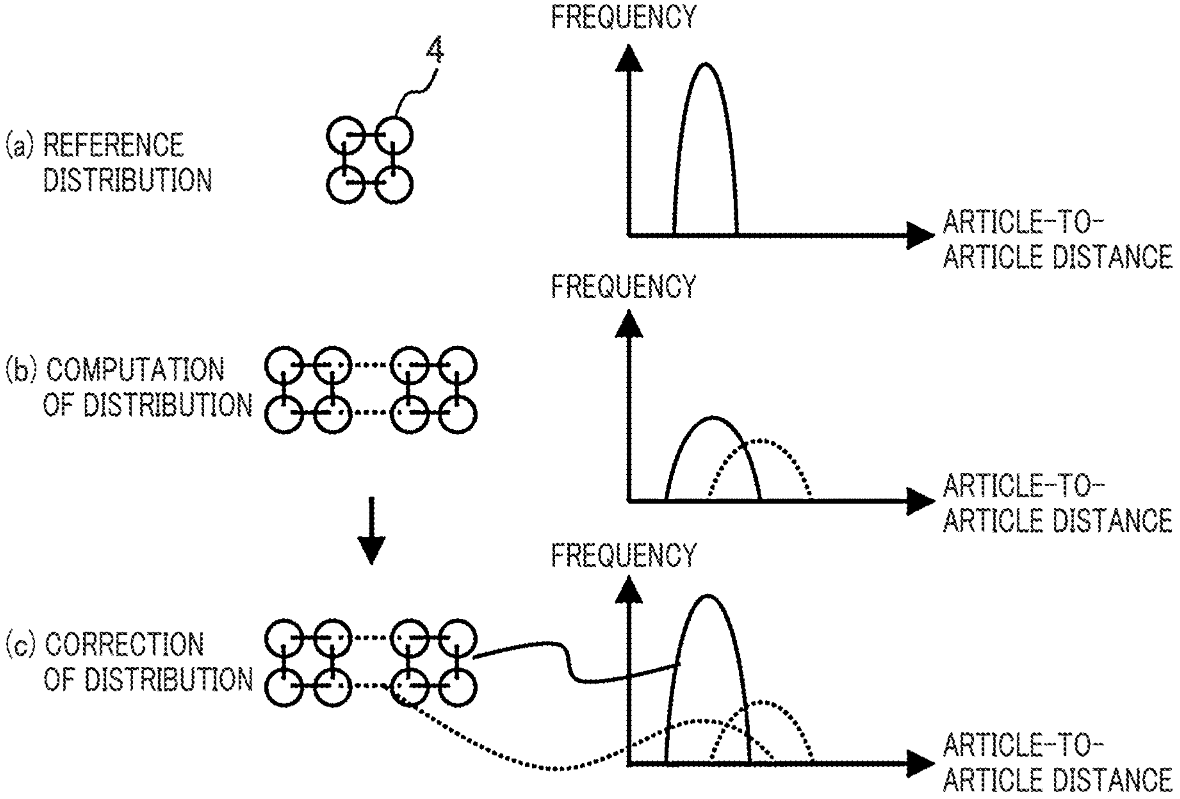
FIG. 6 is a drawing explaining processing of an object recognition apparatus in a third embodiment.

For example, when it is known in advance that four PET bottles (article 4) arranged in a 2×2 matrix are a transport unit as shown in FIG. 6(*a*) as an example, such a frequency distribution of individual article area-to-individual article area information as indicated by the right graph in FIG. 6(*a*) is registered as a basis in the identical article group area estimation unit 11*b* in the present embodiment in advance.

In this case, even when eight PET bottles (article 4) imaged with the stereo cameras 3 are disposed as shown in FIG. 6(*b*) and in a frequency distribution of individual article area-to-individual article area information extracted from the image, a difference between a solid line group and a dotted line group is small as indicated by the right graph in FIG. 6(*b*) as an example, it can be determined that a solid line distance is matched with the features (frequency distribution of individual article area-to-individual article area information) of transport unit as the basis and a dotted line distance is not matched with the features (frequency distribution of individual article area-to-individual article area information) of transport unit as the basis; therefore, an corrective action can be taken to emphasize the frequency of the solid line group. As a result, in the object recognition apparatus 1 in the present embodiment, eight PET bottles (article 4) arranged in a 2×4 matrix can be correctly divided into two identical article group areas comprised of four PET bottles (article 4) arranged in a 2×2 matrix.

In the above description, information of the distribution of individual article area-to-individual article area information is registered in advance; instead, relative to a frequency distribution of individual article area-to-individual article area information computed in the past, a subsequent identical article group area may be estimated.

Fourth Embodiment

Subsequently, a description will be given to an object recognition apparatus 1 according to the fourth embodiment of the present invention. With respect to an item common to those in the above-mentioned embodiments, an overlapped description will be omitted.

In the present embodiment, a template of an area embracing two or more article areas or a pattern feature value acquired from the area is taken as article area-to-article area information. For example, when an article 4 to be transported is PET bottles, the PET bottles are provided on the cap thereof with a pattern, the orientations of the patterns are always aligned within an identical article group, an identical article group area can be estimated by: computing a distribution in which the horizontal axis indicates a pattern feature value and the vertical axis indicates a frequency; and detecting a discrepancy in the orientation of the pattern as a difference in template or a difference in pattern feature value (difference in frequency distribution on the horizontal axis) based on a result of this computation.

LIST OF REFERENCE SIGNS

1: object recognition apparatus
11: processor
11*a*: article detection unit
11*b*: identical article group area estimation unit
12: storage device
12*a*: object recognition processing program
13: input device
14: output device
15: communication interface
15*a*: input unit
15*b*: output unit
16: bus
2: robot
21: articulate arm
22: hand
3: stereo camera
3L: left camera
3R: right camera
4: article
5: pallet
6: pattern

The invention claimed is:

1. An object recognition apparatus that recognizes an identical article group as a transport unit in an environment in which a plurality of articles is present, the object recognition apparatus comprising:

an input unit that acquires an image of the plurality of the articles;

an article detection unit that detects an article area where the articles are present from the image; and an identical article group area estimation unit that acquires individual article area-to-individual article area information, which is information related to a disposition of the article area, computes a frequency distribution of the individual article area-to-individual article area information, and estimates an area of the identical article group based on the frequency distribution, wherein the identical article group is a transport unit obtained by packing a plurality of articles with a wrap, and wherein a frequency distribution as a basis is registered in the identical article group area estimation unit in advance and the area of the identical article group is estimated based on the basis.

2. The object recognition apparatus according to claim 1, wherein the individual article area-to-individual article area information is a distance between some article area and an adjacent article area, an angle between some article area and an adjacent article area, or the direction of the normal of each article area.

3. The object recognition apparatus according to claim 1, wherein the identical article group is a transport unit obtained by wholly packing a plurality of articles with a transparent wrap.

4. The object recognition apparatus according to claim 3, wherein the transparent wrap is printed with a pattern, and wherein the individual article area-to-individual article area information is a distance between the pattern and an adjacent article area, an angle between the pattern and an adjacent article area, or the direction of the normal of the pattern.

5. The object recognition apparatus according to claim 1, wherein the identical article group is a transport unit obtained by binding the side faces of a plurality of articles with a wrap or a cardboard.

6. The object recognition apparatus according to claim 1, wherein the identical article group area estimation unit computes a probability that a plurality of the articles is present in a single identical article group area and a probability that a plurality of the articles is dispersed in a plurality of identical article group areas.

7. The object recognition apparatus according to claim 1 wherein the frequency distribution as the basis is a frequency distribution computed by the identical article group area estimation unit in the past.

8. A robot system including an object recognition apparatus according to claim 1 and a robot that transports the identical article group, wherein the object recognition apparatus includes:

an output unit that outputs information of the area of the identical article group estimated; and a control unit that controls the robot based on the information of the area of the identical article group outputted from the output unit.

9. An object recognition method for recognizing an identical article group as a transport unit in an environment in which a plurality of articles is present, the object recognition method comprising:

an input step to acquire an image of the plurality of the articles;

an article detection step to detect an article area where a plurality of the articles is present from the image; and an identical article area estimation step to acquire individual article area-to-individual article area information, which is information related to a disposition of the article area, compute a frequency distribution of the individual article area-to-individual article area information, and estimate an area of the identical article group based on the frequency distribution, wherein the identical article group is a transport unit obtained by packing a plurality of articles with a wrap, and wherein a frequency distribution as a basis is registered in the identical article group area estimation unit in advance and the area of the identical article group is estimated based on the basis.

* * * * *